Aug. 27, 1940.  F. D. COULTER  2,212,537
AIRCRAFT LANDING-FLOOR BEACON
Filed Jan. 15, 1936  2 Sheets-Sheet 1

INVENTOR
Fred D. Coulter
BY
ATTORNEY

Aug. 27, 1940.   F. D. COULTER   2,212,537
AIRCRAFT LANDING-FLOOR BEACON
Filed Jan. 15, 1936   2 Sheets-Sheet 2

INVENTOR
Fred D. Coulter
BY
Robert A. Lavender
ATTORNEY

Patented Aug. 27, 1940

2,212,537

UNITED STATES PATENT OFFICE 2,212,537

AIRCRAFT LANDING-FLOOR BEACON

Fred D. Coulter, Bremerton, Wash.

Application January 15, 1936, Serial No. 59,228

4 Claims. (Cl. 240—1.2)

(Granted under the act of March 3, 1883, as amended April 30, 1928; 370 O. G. 757)

This invention relates to means for lighting a space upon which aircraft may land without interfering with free movement of the aircraft thereover or dazzling the eyes of a pilot thereon.

Among the objects of this invention are: To provide a lighting means projecting beams of light visible over only a limited zone; to provide a lighting means that will give forth beams of light to indicate one or more landing angles; to produce beams that are a diffused glow so that they will not interfere with clear perception of the landing area; to provide groups of beams from a common source with the axes of the beams in each group lying in a common plane and with the planes of the axes of the different groups at an angle to each other.

The frequency with which aircraft are required to land at night upon the deck of a carrier vessel makes it necessary that some means be provided for defining the landing area with lights. It is evident that a desirable illuminating unit for this purpose must be set flush with the landing deck to permit free travel of the aircraft thereover. For purposes of secrecy it is preferable that the beams of light emitted from units on a landing deck should be visible over a limited zone only and since the pilots of aircraft attached to such ship will know approximately the location thereof they will have little difficulty in finding the ship but the lights will not be seen by an enemy except by chance. It is also important that lights used for this purpose should not be so bright as to interfere with the vision of a pilot making a landing on a deck equipped therewith while at the same time they must be definitely visible. The lighting units may be disposed in different patterns on different ships whereby, if several carriers are operating in the same general area, a pilot may, from the air, identify his own ship.

Figure 1:
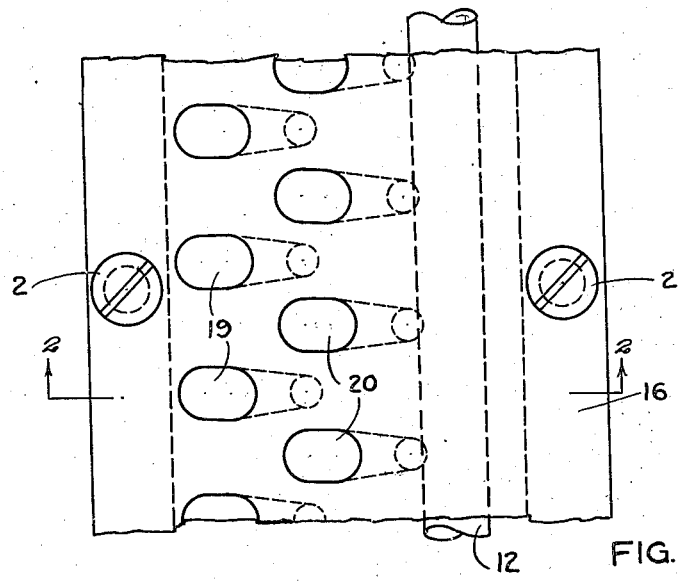
Fig. 1 is a fragmentary top plan view of a lighting means embodying the present invention.
Figure 2:
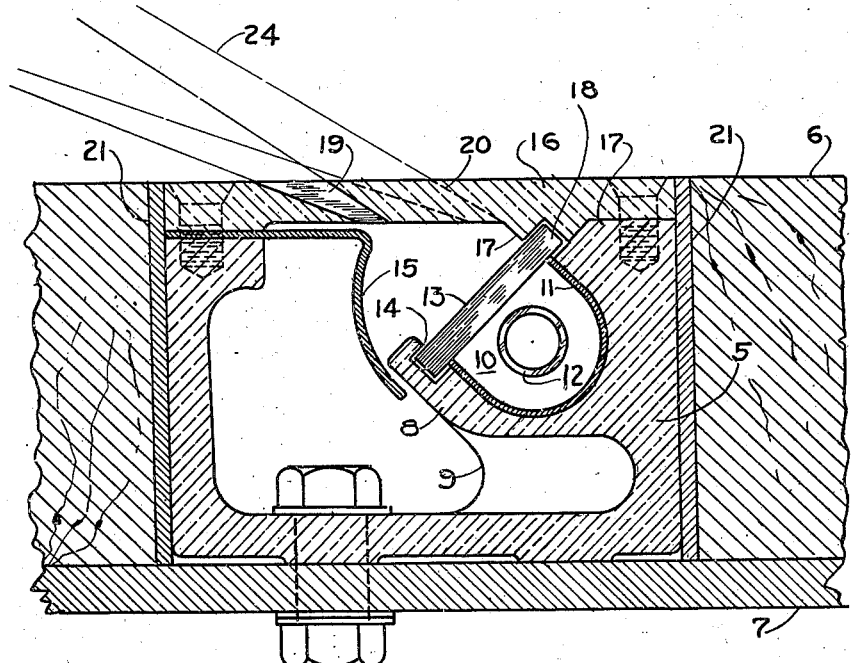
Fig. 2 is a transverse section therethrough substantially on the line 2—2 of Fig. 1.

As shown in Figs. 1 and 2, the body 5 of the lighting unit is set down in the wood planking 6 of the deck and secured to the steel deck 7 thereunder. The said body is preferably made of brass and is substantially hollow with a rib 8 projecting outwardly into the cavity at substantially an angle of 45° to the plane of the deck, although this angle may vary to suit requirements in particular cases. Webs 9 are connected to the rib 8 and the base of body 5 to strengthen the rib. The channel 10 defined upon one side by the rib 8 faces outwardly and upwardly and is provided with a reflecting surface 11 on its wall.

A neon tube 12 extending the length of channel 10 is disposed in the channel and a glass cover 13, preferably frosted and non-shatterable, is disposed to close the open side of channel 10, one side of said glass being disposed in a rabbet 14 in rib 8, the joint being made water-proof with canvas and red lead. It is, of course, obvious that a plurality of other types of light sources might be used instead of neon tube 12 but the neon tube has characteristics of continuity and type of light emitted that make it desirable for this purpose. An arcuate reflector 15 extending the length of channel 10 is provided to prevent loss of light that might otherwise be reflected into the cavity in body 5.

The cover 16 is provided on its under-surface with V-shaped ribs 17 that define a V-shaped channel 18, the two ribs 17 fitting against the outer face and upper edge, respectively, of the glass plate 13 to retain the said plate in position over channel 10, the joint being made water-proof with canvas and red lead. A plurality of substantially conical apertures 19 and 20 are formed in cover 16, the axes of the apertures 19 being substantially co-planar and at such angle to the surface of the cover 16 that the beams of light passing therethrough will indicate the landing angle for aircraft landing at a high angle and the axes of the apertures 20 lights are co-planar and define a low landing angle. The walls of the apertures 19 and 20 are blackened or otherwise made non-reflecting and suitable light transmitting material, such as glass, is disposed in the apertures to prevent passage of water and other foreign substances therethrough. It is apparent that due to the frosting of the glass cover 13 the light emitted through apertures 19 and 20 will be a diffused glow instead of bright and dazzling. The space between body 5 and deck planks 6 is filled with suitable calking material 21 to prevent access of water around the body.

Figure 3:
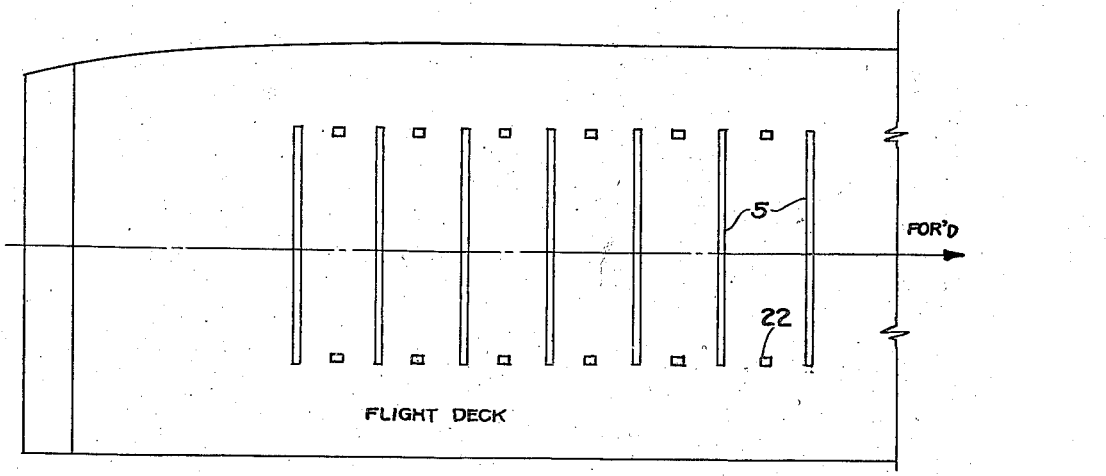
Fig. 3 illustrates one pattern formed by arranging my lighting units on the deck of a ship.
Figure 4:
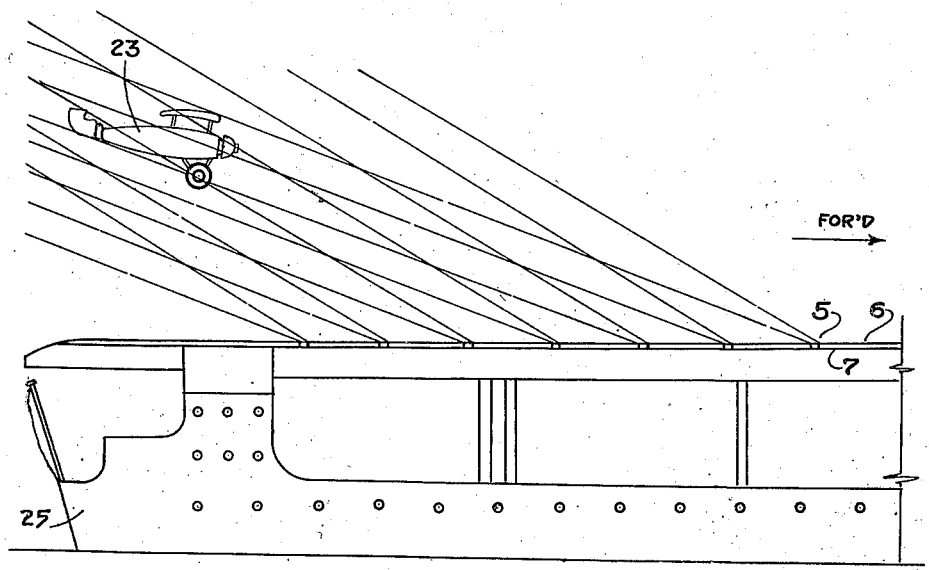
Fig. 4 shows an aircraft making a landing on the deck of a ship provided with the present invention.

It will be observed from Fig. 3 that the bodies 5 may be elongated to substantially the full width of the landing area or they may be short as indicated at 22 and any combination of long and short lighting units may be used to produce a distinctive pattern that is visible from the air